US010938855B1

(12) United States Patent
Waldie et al.

(10) Patent No.: US 10,938,855 B1
(45) Date of Patent: Mar. 2, 2021

(54) SYSTEMS AND METHODS FOR AUTOMATICALLY AND SECURELY PROVISIONING REMOTE COMPUTER NETWORK INFRASTRUCTURE

(71) Applicant: Digi International Inc., Hopkins, MN (US)

(72) Inventors: Robert Alan Waldie, Slough (GB); Kenneth Peter Gilmore Wilson, Banyo (AU); Marcio Hideki Saito, San Jose, CA (US); Antonio Basilio Merenda, Brisbane (AU)

(73) Assignee: Digi International Inc., Hopkins, MN (US)

( * ) Notice: Subject to any disclaimer, the term of this patent is extended or adjusted under 35 U.S.C. 154(b) by 119 days.

(21) Appl. No.: 16/015,011

(22) Filed: Jun. 21, 2018

Related U.S. Application Data

(60) Provisional application No. 62/524,394, filed on Jun. 23, 2017.

(51) Int. Cl.
*H04L 29/06* (2006.01)
*G06F 9/445* (2018.01)
(Continued)

(52) U.S. Cl.
CPC .............. *H04L 63/164* (2013.01); *G06F 8/60* (2013.01); *G06F 9/44505* (2013.01);
(Continued)

(58) Field of Classification Search
CPC .............. H04L 63/164; H04L 63/0272; H04L 63/0428; H04L 41/0806; G06F 8/60;
(Continued)

(56) References Cited

U.S. PATENT DOCUMENTS 5,999,592 A * 12/1999 Sestak ..................... H04M 3/08
379/14
6,167,567 A * 12/2000 Chiles ..................... G06F 9/454
717/173
(Continued)

FOREIGN PATENT DOCUMENTS

EP          2043320 A1 *  4/2009  .......... G06F 9/4416

*Primary Examiner* — Kambiz Zand
*Assistant Examiner* — Mahabub S Ahmed
(74) *Attorney, Agent, or Firm* — Knobbe, Martens, Olson & Bear, LLP

(57) ABSTRACT

Systems and methods for computer network infrastructure provisioning are provided. In one illustrative implementation, a base server is sent to and physically installed at a remote site by field technicians, the base server automatically and securely connects back to a central site, and then becomes the platform to logically provision all other network elements to start a remote network infrastructure, wherein this process may be accomplished without intervention by network engineers at the remote site. The connection and communication between the central and remote site can be implemented over various networks, such as over the Internet, over a private IP network, over a cellular network, and/or other networks. According to implementations herein, the base server can ensure physical and logical integrity even if the environment or the chain of custody of the equipment involved is not trusted.

20 Claims, 11 Drawing Sheets

(51) Int. Cl.
*G06F 21/78* (2013.01)
*G06F 21/57* (2013.01)
*G06F 8/60* (2018.01)
*G06F 21/55* (2013.01)
*H04L 12/24* (2006.01)

(52) U.S. Cl.
CPC .......... *G06F 21/554* (2013.01); *G06F 21/575* (2013.01); *G06F 21/78* (2013.01); *H04L 63/0272* (2013.01); *H04L 63/0428* (2013.01); *H04L 41/0806* (2013.01)

(58) Field of Classification Search
CPC .. G06F 9/44505; G06F 21/554; G06F 21/575; G06F 21/78
USPC ...................................................... 713/151
See application file for complete search history.

(56) References Cited

U.S. PATENT DOCUMENTS

| | | | | |
|---|---|---|---|---|
| 6,606,744 | B1* | 8/2003 | Mikurak | H04L 29/06 717/174 |
| 6,765,881 | B1* | 7/2004 | Rajakarunanayake | H04L 12/4641 370/254 |
| 7,124,289 | B1* | 10/2006 | Suorsa | G06F 8/61 713/1 |
| 7,257,106 | B2* | 8/2007 | Chen | H04L 12/2803 370/338 |
| 7,299,277 | B1* | 11/2007 | Moran | H04L 41/5022 370/230 |
| 8,897,174 | B2* | 11/2014 | Komarevtsev | H04L 41/0843 370/255 |
| 10,003,495 | B1* | 6/2018 | Sharma | H04L 67/34 |
| 2002/0068559 | A1* | 6/2002 | Sharma | H04W 24/00 455/423 |
| 2002/0136165 | A1* | 9/2002 | Ady | G06F 11/2294 370/241 |
| 2003/0016803 | A1* | 1/2003 | Schmid | H04L 43/0811 379/201.01 |
| 2003/0018889 | A1* | 1/2003 | Burnett | H04L 41/0809 713/153 |
| 2003/0140223 | A1* | 7/2003 | Desideri | H04L 63/20 713/153 |
| 2004/0015952 | A1* | 1/2004 | Lajoie | G06F 8/65 717/171 |
| 2004/0073640 | A1* | 4/2004 | Martin | H04L 67/1002 709/223 |
| 2004/0215751 | A1* | 10/2004 | Kumar | H04L 41/044 709/222 |
| 2004/0261116 | A1* | 12/2004 | Mckeown | H04L 43/00 725/109 |
| 2005/0025302 | A1* | 2/2005 | Schmid | H04L 63/0428 379/221.15 |
| 2005/0193103 | A1* | 9/2005 | Drabik | H04L 63/0272 709/221 |
| 2005/0198629 | A1* | 9/2005 | Vishwanath | G06F 8/61 717/174 |
| 2006/0080462 | A1* | 4/2006 | Asnis | H04L 41/0809 709/238 |
| 2006/0109797 | A1* | 5/2006 | Ishida | H04L 61/251 370/252 |
| 2006/0236095 | A1* | 10/2006 | Smith | H04L 63/0823 713/153 |
| 2007/0073800 | A1* | 3/2007 | Rothman | H04L 41/082 709/202 |
| 2007/0192863 | A1* | 8/2007 | Kapoor | H04L 67/10 726/23 |
| 2007/0220602 | A1* | 9/2007 | Ricks | H04L 63/20 726/22 |
| 2007/0244987 | A1* | 10/2007 | Pedersen | H04L 67/06 709/217 |
| 2007/0268506 | A1* | 11/2007 | Zeldin | H04L 41/0806 358/1.13 |
| 2007/0268514 | A1* | 11/2007 | Zeldin | H04L 41/0273 358/1.15 |
| 2007/0268515 | A1* | 11/2007 | Freund | H04L 67/34 358/1.15 |
| 2007/0268516 | A1* | 11/2007 | Bugwadia | H04L 41/0886 358/1.15 |
| 2008/0076547 | A1* | 3/2008 | Bigelow | G06F 21/57 463/29 |
| 2008/0134175 | A1* | 6/2008 | Fitzgerald | G06F 21/53 718/1 |
| 2009/0307763 | A1* | 12/2009 | Rawlins | G06F 11/3672 726/5 |
| 2010/0046531 | A1* | 2/2010 | Louati | H04L 45/586 370/401 |
| 2010/0100876 | A1* | 4/2010 | Glover | H04W 4/00 717/178 |
| 2010/0142410 | A1* | 6/2010 | Huynh Van | H04L 12/4641 370/255 |
| 2010/0180016 | A1* | 7/2010 | Bugwadia | H04W 24/02 709/220 |
| 2011/0010543 | A1* | 1/2011 | Schmidt | G06F 21/57 713/168 |
| 2012/0002813 | A1* | 1/2012 | Wei | H04L 63/0272 380/270 |
| 2012/0167196 | A1* | 6/2012 | Colar | H04L 12/4641 726/15 |
| 2012/0185913 | A1* | 7/2012 | Martinez | G06F 9/45558 726/1 |
| 2012/0197973 | A1* | 8/2012 | Tukol | G06F 9/4451 709/203 |
| 2012/0198222 | A1* | 8/2012 | Tukol | G06F 9/44505 713/2 |
| 2012/0290870 | A1* | 11/2012 | Shah | H04W 24/02 714/4.11 |
| 2013/0091193 | A1* | 4/2013 | Nachtrab | H04L 29/08567 709/202 |
| 2014/0129613 | A1* | 5/2014 | Van Depoel | H04L 67/125 709/202 |
| 2014/0137188 | A1* | 5/2014 | Bartholomay | H04L 65/40 726/3 |
| 2014/0235230 | A1* | 8/2014 | Raleigh | H04L 12/14 455/419 |
| 2014/0250292 | A1* | 9/2014 | Edwards | G06F 9/4401 713/2 |
| 2015/0067176 | A1* | 3/2015 | Dubois | G06F 19/3418 709/227 |
| 2015/0180714 | A1* | 6/2015 | Chunn | H04L 41/082 709/221 |
| 2015/0256391 | A1* | 9/2015 | Hardy | H04W 12/04 709/222 |
| 2015/0286831 | A1* | 10/2015 | More | H04L 63/10 726/27 |
| 2016/0043549 | A1* | 2/2016 | Beauregard | H04L 67/12 700/286 |
| 2016/0044012 | A1* | 2/2016 | Carrer | H04W 12/08 726/6 |
| 2016/0094363 | A1* | 3/2016 | Ravi | G06F 21/57 370/401 |
| 2016/0149807 | A1* | 5/2016 | Zanfei | H04L 12/2856 709/238 |
| 2016/0330132 | A1* | 11/2016 | Rickey | G06F 16/86 |
| 2017/0132621 | A1* | 5/2017 | Miller | G06Q 20/065 |
| 2017/0249135 | A1* | 8/2017 | Gandhi | H04L 67/125 |
| 2017/0323120 | A1* | 11/2017 | Anderson | G06F 21/44 |
| 2018/0041529 | A1* | 2/2018 | Mixer | H04L 63/0245 |
| 2018/0167271 | A1* | 6/2018 | Bower, III | H04L 41/0886 |
| 2018/0268359 | A1* | 9/2018 | Soubhagya | G08G 1/096741 |
| 2018/0293080 | A1* | 10/2018 | Rothman | G06F 3/0685 |
| 2018/0367326 | A1* | 12/2018 | Esken | G06F 9/44505 |
| 2019/0089732 | A1* | 3/2019 | Thomas | H04L 9/002 |
| 2019/0158539 | A1* | 5/2019 | Hankins | H04L 67/28 |

* cited by examiner

SYSTEMS AND METHODS FOR AUTOMATICALLY AND SECURELY PROVISIONING REMOTE COMPUTER NETWORK INFRASTRUCTURE

CROSS-REFERENCE TO RELATED APPLICATION(S) INFORMATION

This application claims benefit/priority to U.S. provisional patent application No. 62/524,394, filed Jun. 23, 2017, which is incorporated herein by reference in entirety.

APPENDIX MATERIALS

Seven Appendices of related materials, which are related to and/or involved with various aspects of the innovations herein, are submitted herewith and incorporated into the present disclosure. Specifically, the Appendices include: (1) Appendix A, which is a document summarizing out-of-band management technology and network operations system consonant with one or more aspects of the present innovations; (2) Appendix B, which is a block diagram depicting the wireless functionality of infrastructure management equipment that may be configured consonant with one or more aspects of the present innovations; (3) Appendix C, which is a block diagram depicting the integrated circuit design of an infrastructure management equipment that may be configured consonant with one or more aspects of the present innovations; (4) Appendix D; which is a block diagram depicting the SSD, USB, LPC, and modem configuration of an infrastructure management equipment that may be configured consonant with one or more aspects of the present innovations; (5) Appendix E, which is code that implements the Call Home feature referenced in the present disclosure and/or otherwise consonant with one or more aspects of the present innovation; (6) Appendix F, which is code configuring a VPN tunnel to access network infrastructure that may be configured consonant with one or more aspects of the present innovations; and (7) Appendix G, which is exemplary code relating to how the remote devices may be configured to access the network infrastructure as may be consonant with one or more aspects of the present innovation.

BACKGROUND

Field

This invention relates to the field of computer network management, and specifically to the initial provisioning of computer network infrastructure in a remote and often untrusted physical environment, such as processes sometimes referred to as Day-One Provisioning.

Description of the Related Art

Provisioning of a network device encompasses its physical deployment and connections, then setting up its initial configuration so that it can connect itself to the local computer network infrastructure.

The build-out of a computer network infrastructure typically involves the following steps: (1) Network Design—Network architects plan and design physical and logical network topology; (2) Physical Provisioning—Field technicians physically install and connect network equipment and cabling; and (3) Logical Provisioning—Network engineers update the firmware, configure and test network equipment and connect the new infrastructure through the network uplink to the central site. Oftentimes, the build-out of such computer network infrastructure must be performed at sites that are remote to the network engineers managing it.

The physical space at such remote sites (data center, remote branch, IT closet) can be owned by the company building the network or can be space rented from third-party, e.g., a co-location facility.

Network engineers also involved with such build-outs are typically based at company headquarters, close to large urban centers where most of the users of the infrastructure are.

Increasingly, large data centers are being placed at remote locations based on environmental impact and electrical power availability. Increasing use of connected devices (e.g. Internet of Things) and the use of Internet applications that require the transfer of large amounts of data (e.g. consumption of video content) are forcing service providers to deploy smaller units of IT infrastructure at remote locations, closer to the edge of the network. These trends increase the need of deployment of computer network infrastructure at sites that are remote to the location of the network engineers managing it.

Field technicians working at the data center site and physically installing equipment are often contractors who lack one or both of the knowledge to logically configure specialized or proprietary equipment or connect the network uplink, and/or the security clearance needed to perform these and other associated tasks.

If there was a secure connection between the central and remote site, network engineers at the central site could attempt to perform the logical provisioning remotely. That is not possible, today, as the network element connecting the remote site to the network uplink must be completely and correctly configured, or else it opens the door for a malicious attacker to exploit faulty security configuration or known bugs in old equipment firmware.

So, when network engineers are at a central site that is geographically distant from the network location, they need to travel to the remote site to execute the logical provisioning of the computer network infrastructure. This not only incurs significant personnel and travel costs but also becomes inviable as the scale of modern data centers grow and demand a continuous process of infrastructure deployment.

Accordingly, there is no end-to-end solution that addresses the problem today.

Currently, various attempts to work around these problems and drawbacks exist via one or both common practices below. These incur significant costs and increase logistical complexity as explained herein.

A) Network engineers are transported to site during turn up.

As a first drawback to such practice, travel schedules must be carefully coordinated. Travel costs such as airfare, insurance, accommodation, per diem payments and penalty rate wages are incurred.

Further, by introducing specialized onsite staff dedicated to the task at hand, the window of time for provisioning the network becomes critical and inflexible. Hourly staff costs increase, compounding the negative financial impact of blocking issues, e.g., delays such as ISP uplink delivery or faulty infrastructure requiring manufacturer repair.

Moreover, such network sites like data centers can be physically uncomfortable (cramped, noisy, dark, cold), and not conducive to abstract problem solving and technical attention to detail.

Finally, it may be unfeasible for network engineers to travel to certain remote network sites, e.g. where they are geographically very remote, engineers cannot obtain visas, or it is very costly and time consuming to do so, and the like.

B) Network engineers pre-stage network equipment and ship pre-fabricated or knocked down rack equipment to site.

This requires the remote network site to be sufficiently simulated in a location convenient to the network engineering team. This is a non-trivial exercise requiring space and duplicating effort (unpack and install at staging area, uninstall and repack, unpack and install at the remote network site).

It can sometimes be possible to reach a compromise by pre-staging only key elements of a computer network infrastructure, such as the network gateway, management network switch and serial console server. However, it is unfeasible or problematic or impossible to simulate the Internet Service Provider (ISP) connection, e.g. a Multi-Protocol Label Switching (MPLS) circuit with a routing and security policy that is particular to the remote network site.

Network equipment must be transported twice, from the supplier to the staging area, and then the staging area to the remote network site, increasing freight costs, risk of damage in transit and associated logistical overheads. Getting equipment to locations such as data centers typically requires a high degree of coordination, as for security reasons they will refuse deliveries unless they are explicitly expected.

Overview of Certain Aspects Herein

Innovative systems and methods herein may provide end-to-end solution(s), such as those related to problems and/or drawbacks associated with the information explained above. For example, via a base server that can guarantee an automatic and secure connection between the central and remote sites without requiring the presence of network engineers at the remote location, present implementations may include various provisioning features, perform various processing, and/or then serve as a base for automated provisioning of the other network elements at the remote site. In some embodiments, aspects including orchestration of such operation(s) may be controlled by management software running in one or both of the base server and/or a computer at the central site.

Various innovations herein are also achieved via the unique combined application of hardware technology (e.g., in the base server, to ensure network availability and physical integrity) and specially developed management software.

Innovative aspects related to the hardware technologies may include though are not limited to: secure memory, cryptographic engine, trusted platform module(s), built-in cellular communications radio, and/or tamper-resistant mechanical design.

Innovative aspects related to software technologies may include though are not limited to: management software implementing a secure workflow that guarantees the integrity of a secure connection between the remote and central site and automates the provisioning of other network elements without requiring the presence of network engineers at the remote site.

Implementations and systems herein may involve and/or support a plurality of methods for the base server to automatically provision (e.g., configure, startup, etc.) other network elements at the remote site. Such methods may include though are not limited to:

(a) Provisioning network elements through Dynamic Host Configuration Protocol and subsequent file transfer protocols such as Trivial File Transfer Protocol and Hypertext Transfer Protocol (a.k.a. Zero Touch Provisioning) involving method(s) of assigning IP addresses and automatically configuring networking elements;

(b) Use of Simple Network Management Protocol and NETCONF, two industry-standard protocols used to configure network equipment. However, these rely on direct reachability of the target equipment and can only reach remote network sites via a proxy or gateway; and/or (c) Several orchestration management systems in use today to automate the configuration of network equipment (e.g. Puppet, Chef, Salt, Ansible), however these typically rely on direct reachability of the target equipment and can only reach remote network sites via a proxy or gateway.

Drawbacks associated with existing systems also include issues related to their configuration for use only with a local network. Other aspects herein relate to existing systems inability to traverse the Internet or cellular networks. Among other things, certain systems and methods herein relate to producing solutions, such as gated solutions, that are specifically configured to provide such functionality.

DETAILED DESCRIPTION OF ILLUSTRATIVE IMPLEMENTATIONS

Reference will now be made in detail to illustrative implementations, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without some of such specific details. Moreover, particular aspects described herein are provided by way of example and should not be used to limit the scope of the invention to these particular implementations. In other instances, certain well-known data structures, timing protocols, software operations, procedures, and components have not been described in detail so as not to unnecessarily obscure aspects of any implementations of the innovations herein.

Figure 1:
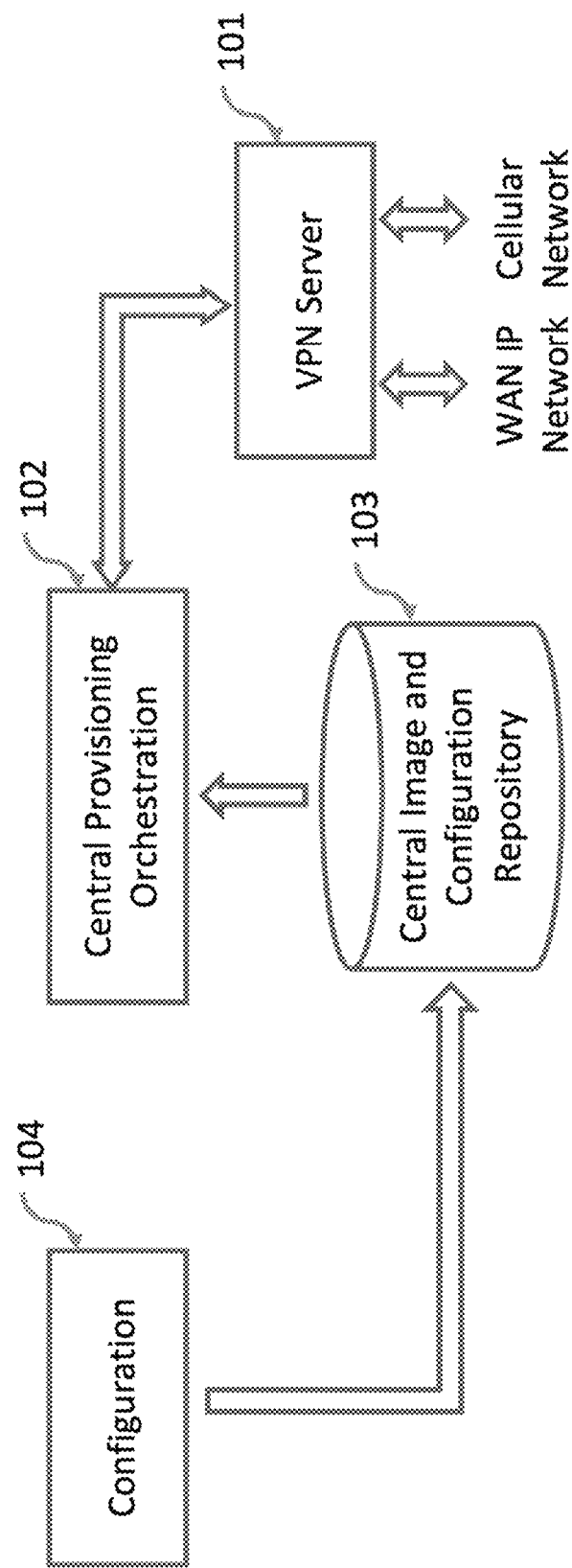
FIG. 1, pertaining to central site management software aspects, is a block diagram depicting and describing illustrative components of exemplary central site management software running in a computer at the central site, according to certain implementations herein.

FIG. 1, pertaining to central site management software aspects, is a block diagram depicting and describing illustrative components of exemplary central site management software running in a computer at the central site, according to certain implementations herein. Such central site management components are shown to illustrate certain aspects of exemplary central site management software running in a computer at the central site that communicates with a base server at a remote site. When the base server shipped to the remote location "calls home", the central site management software connects and establishes the trusted connection with the remote site. Referring to FIG. 1, a VPN server module 101 may establish a secure connection, authenticating that the base server at the remote location is using its pre-configured encryption keys. Once the trusted VPN tunnel is established, no additional authentication is required for requests over the trusted VPN tunnel.

A provisioning orchestration module 102 may then configure the remote base server and download applicable configuration and firmware image files retrieved from an image and configuration repository 103 or other data store for such information. In some implementations, image and configuration files may be manually or automatically generated by network engineers using a separate configuration module 104. Once all files have been transferred, the provisioning orchestration module 102 may send the commands that prepare the base server at the remote site to become the provisioning server for the remote location.

Figure 2:
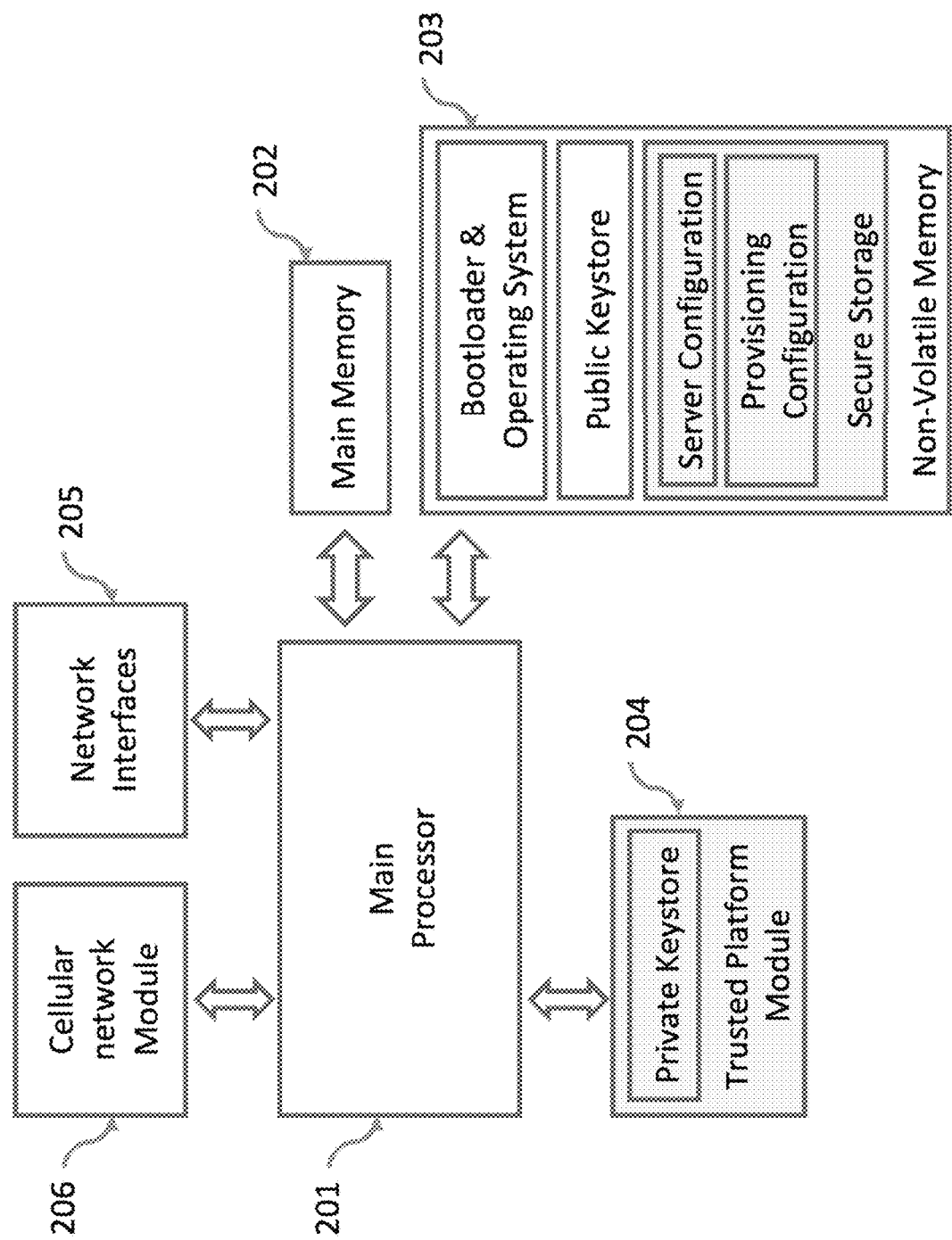
FIG. 2, pertaining to base server hardware architecture aspects, is a block diagram describing one illustrative hardware architecture of an exemplary base server at the remote site, according to certain implementations herein.

FIG. 2, pertaining to base server hardware aspects, is a block diagram describing one illustrative hardware architecture of an exemplary base server at the remote site, according to certain implementations herein. The exemplary base server hardware architecture shown relates to illustrative architecture of the base server at the remote site. Referring to FIG. 2, the base server is a special computer appliance that includes the 201-Main Processor (which can use a common architecture including but not limited to x86, MIPS, ARM), 202-Main Memory (which stores programs and data while the system is operating), and 203-Non-Volatile Memory (including but not limited to Solid State Disk and Flash memory), which stores the server bootloader & operating system, public parts of encryption keys, and a secure area for system configuration and network infrastructure provisioning configuration. 204-Trusted Platform Module (secure memory for storage of private encryption keys; a cryptographic engine capable of encrypting/decrypting data) that can guarantee system integrity, even before operational startup occurs, and secure communications to the central VPN Server Module, 205-Network Interfaces for connections with both the local network and the network uplink, with a plurality of physical network interfaces, and a 206-Cellular Communications Modules providing connectivity with the cellular network, which can be crucial for bootstrapping of the computer network infrastructure when there is no existing network connectivity at the remote site.

Figure 3:
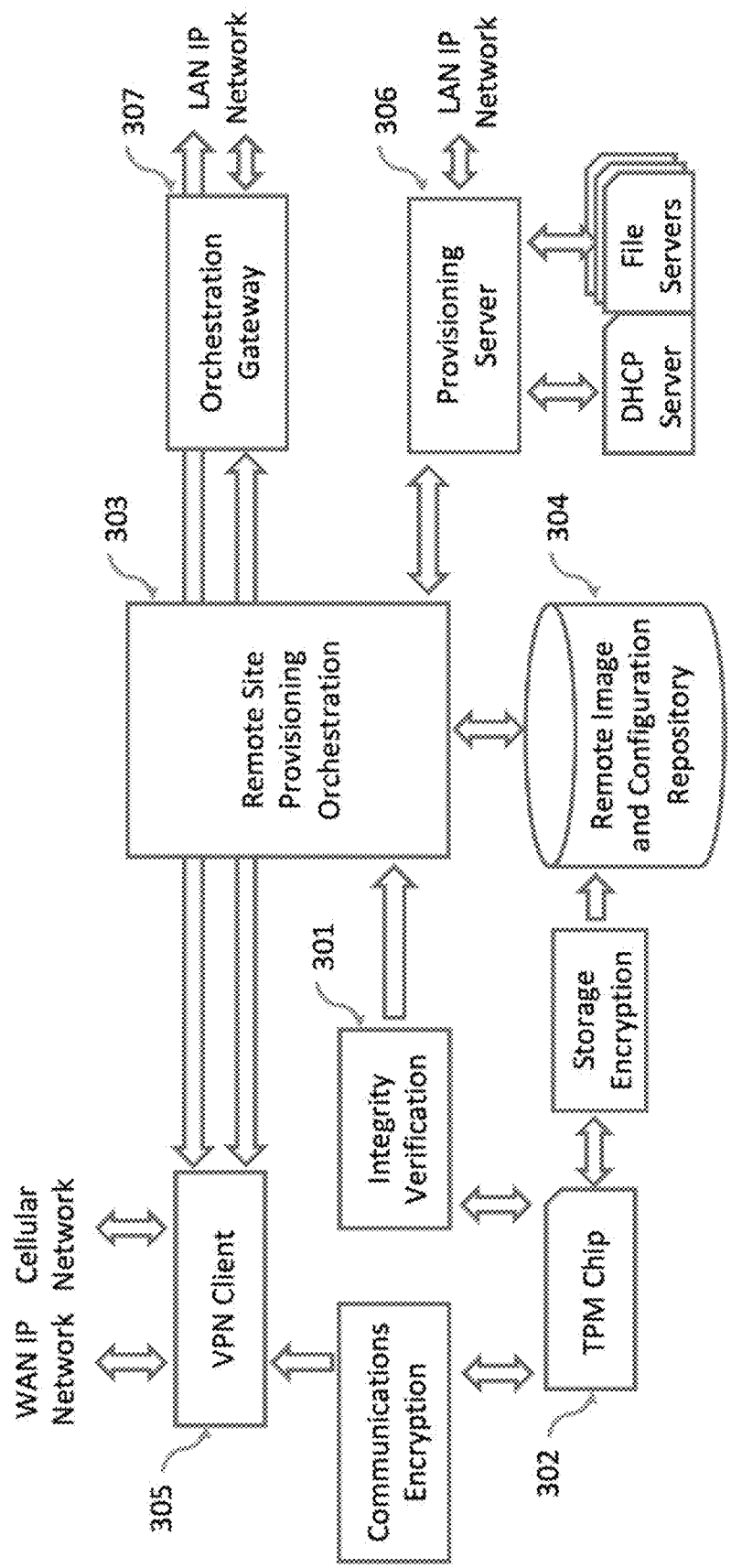
FIG. 3, pertaining to base server software architecture aspects, is a block diagram describing illustrative components of exemplary software running in the base server at the remote site, according to certain implementations herein.

FIG. 3, pertaining to base server software architecture aspects, is a block diagram describing illustrative components of exemplary software running in the base server at the remote site, according to certain implementations herein. In the illustrated software-related diagram of FIG. 3, for example, once it commences operation at the remote site, the integrity verification module 301 interacts with the trusted platform module (TPM) hardware 302 to verify that the base server hardware, software and configuration have not been tampered with from the time it was configured through transportation to and physical deployment at the remote site. If integrity is not verified, integrity verification module 301 halts the system and prevents the base server from starting. If integrity is verified, the remote site provisioning orchestration module 303 is started and it sends a command to the VPN client module 305 to establish a secure connection to the central site. The VPN client module 305 selects the best or least cost connection media (wired IP Network if available, Cellular Network, if wired IP is not available) and connects to the central site. The remote site provisioning orchestration module 303 connects and communicates with the provisioning orchestration module at the central site, replicates the central site image and configuration repository data to the encrypted remote image and configuration repository 304 using distributed source control (e.g. git) or a synchronization protocol (e.g. rsync). The repository is pre-cached to avoid streaming large volumes of data over a cellular connection, to handle timeout-sensitive protocols such as TFTP, which were originally designed for local peers, and to handle potentially high latency, slow, and transmission error-prone cellular links. It then configures and starts the provisioning server module 306, which provides provisioning services to other devices using standard protocols (such as DHCP and TFTP) and an Orchestration Gateway Module 307, which may provide bridged or routed access to the local network for, and can optionally translate commands from, orchestration products such as Puppet, Chef, Ansible among others into standard local management protocols such as SNMP, NETCONF, IPMI among others. The Provisioning Orchestration Modules at both the Central and Remote Site interact with each other to implement the Provisioning workflow illustrated in FIG. 4.

Figure 4:
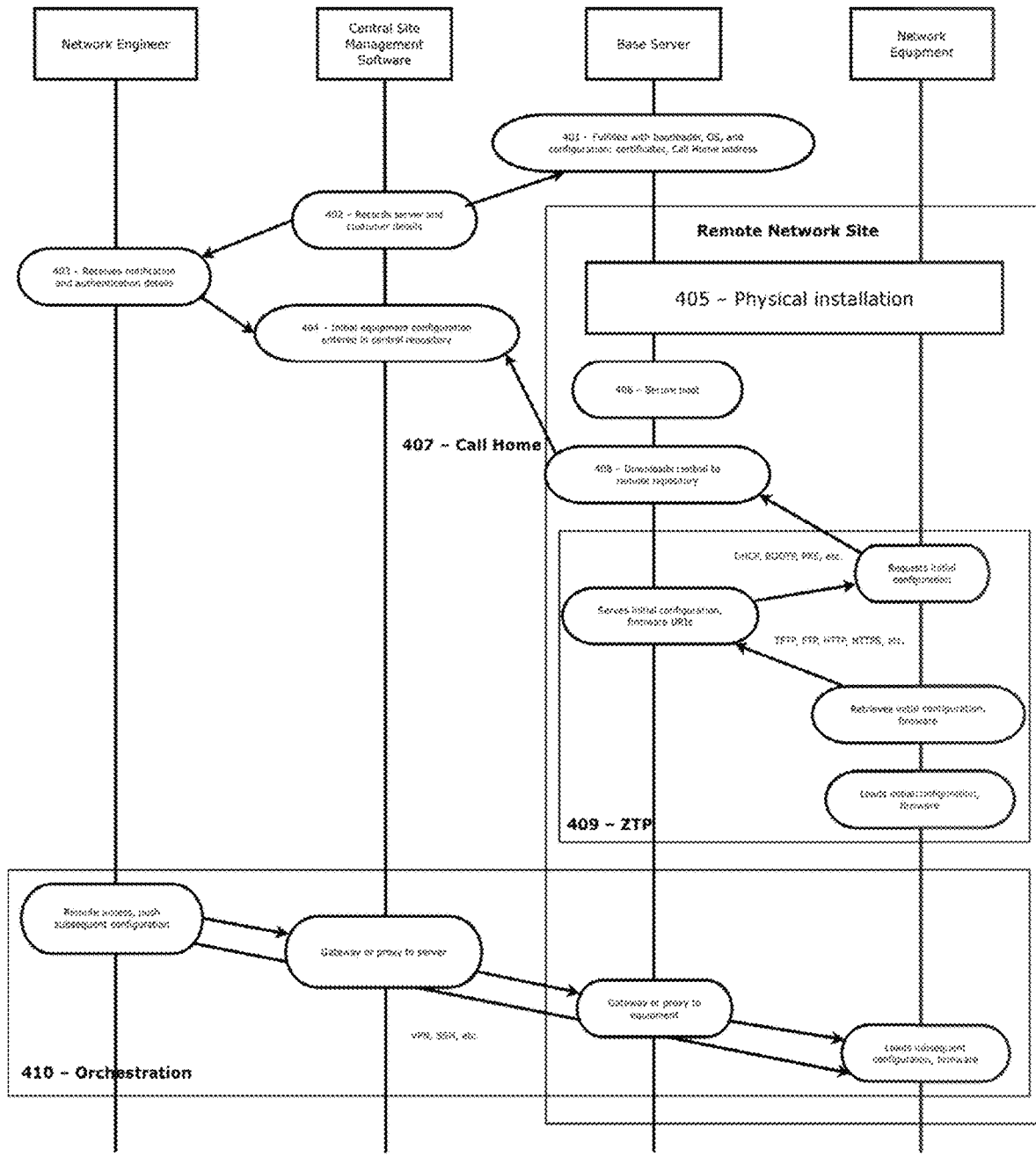
FIG. 4, pertaining to automatic provisioning workflow aspects, is an example flow chart depicting one illustrative process of remote network provisioning consistent with the present innovations, according to certain implementations herein.

FIG. 4, pertaining to automated provisioning workflow aspects, is an example flow chart depicting one illustrative process of remote network provisioning consistent with the present innovations, according to certain implementations herein. Such an exemplary system is designed to accommodate changes in the workflow specific to each specific situation. In one illustrative implementation, as shown/beginning at 401, a base server is fulfilled for delivery to the new remote network site, e.g., during which the base server OS and bootloader are installed, and the base server is preconfigured with security keys to validate software integrity, per-server keys and settings to call home to the central site management software VPN, and automatically generated keys to encrypt its configuration. Next, as illustratively shown in FIG. 4, the base server is authorized to connect to the central site management software, whereupon the central site management software may record server and customer details, at 402. At 403, the network engineer receives notification and authentication details (e.g. including login credentials, etc.), and is thereby authorized to control the base server using the central site management software. Concurrently, the base server is shipped to the new remote site and the network engineer 404 creates equipment configuration in the central site management software's central image and configuration repository. The base server arrives at the remote network site and is 405 physically installed and powered on by the field engineer. The base server 406 boots and verifies integrity, and at 407 establishes a secure VPN connection to central site management software; then, at 408, retrieves the image and configuration repository for this site, containing initial provisioning information for some or all equipment. During the ZTP phase, at 409, equipment in its default factory state broadcasts requests provisioning information via DHCP, the base server responds to the requests offering URLs of configuration and images. The network equipment then downloads such information from the remote repository URLs, and then applies (retrieves and loads) the configuration, firmware, and/or associated image information. (At this point, remote site primary network connectivity may become available, and the base server may re-establish its connection to the central site management software using the newly provisioned primary gateway.) During the 410-orchestration phase, the network engineer uses standard orchestration workflow to securely push full and ongoing configuration directly to the remote network equipment over the VPN, via the central site management software proxy when direct routing is problematic (e.g. duplicate remote network subnets), or optionally via the orchestration gateway's proxy or translation modules. The remote network site is now provisioned.

Figure 5:
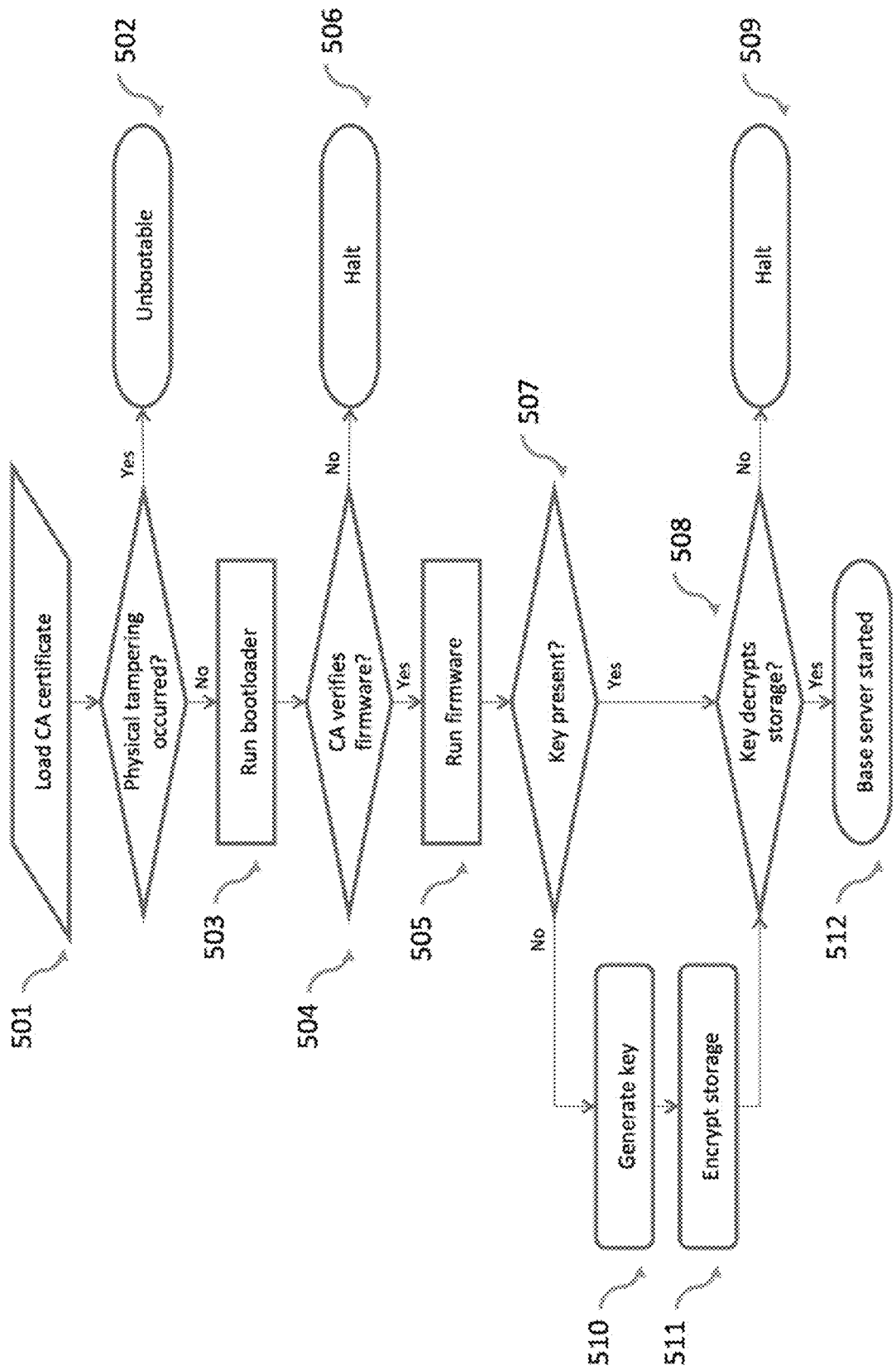
FIG. 5, pertaining to base server boot process aspects, is an example flow chart depicting the initial startup and integrity verification process of the base server from a powered off, power cycled, soft or hard reset state, according to certain implementations herein.

FIG. 5, pertaining to base server boot process aspects, is an example flow chart depicting the initial startup and integrity verification process from a powered off, power cycled, soft or hard reset state, according to implementations herein.

The pre-boot runtime environment loads the system vendor public CA from the unencrypted storage 501. In an example implementation, if physical tampering has occurred, the access lines to storage becomes physically damaged and the process cannot continue; the base server is rendered inoperable 502. If physical integrity has not been compromised, the bootloader runs 503.

The bootloader verifies the firmware memory containing the OS image has been signed using the vendor CA, and has not been replaced with unauthorized image 504. If verified, the operating system is started 505 otherwise the process does not continue; the base server is rendered inoperable 506.

The operating system checks for the existence of a secure key store containing per-base server security keys 507. If present, the keys are loaded and used to decrypt the storage partition(s) containing the base server configuration and remote image and configuration storage repository 508. Decryption failure indicates loss of logical integrity, and the process does not continue; the base server is rendered inoperable 509.

If keys are not present, the operating system generates unique keys 510, utilizing the TPM chip's Random Number Generator (RNG) functionality for strong entropy. The operating system creates and initializes the storage partition(s) as encrypted volumes using the generated keys 511.

The physical and logically verified base server system enters its primary operating mode 512, e.g. Call Home phase.

Figure 6:
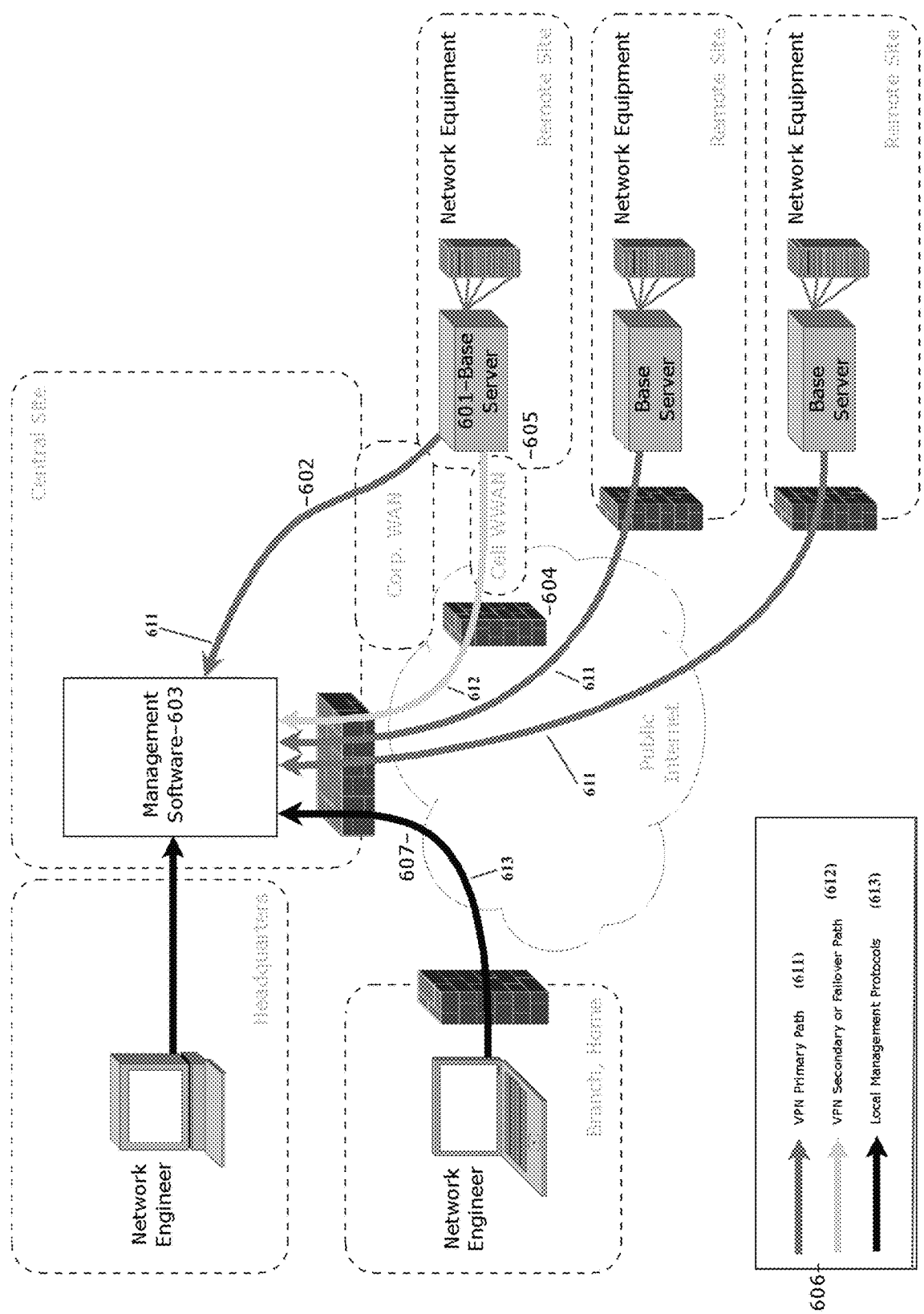
FIG. 6, pertaining to management VPN aspects, is a network diagram depicting the secure VPN tunnel(s) established by the base server(s) at remote site(s), to facilitate secure communications over untrusted networks, and bidirectional communications from unknown or non-routable remote networks, according to certain implementations herein.

FIG. 6, pertaining to management VPN aspects, is a network diagram depicting the secure VPN tunnel(s) established by the base server(s) at remote site(s), to facilitate secure communications over untrusted networks, and bidirectional communications from unknown or non-routable remote networks, according to certain implementations herein.

Once the Call Home phase has completed, the base server 601 has been authorized to connect to the management software's VPN, and the base server is provisioned with a VPN client configuration suitable for establishing the connection.

The connection is established northbound 602 from each base server on the remote network, to the management software 603 located on a central network, to a routable IP address(es) or DNS address(es) of the management software, as specified by the VPN client configuration. It is expected that the central management software will have a known, routable and static address, whereas the base server will be at an unknown, dynamic or non-routable (e.g. a private address specified by RFC1918 such as cellular carrier-grade NAT 604) network address.

It is also expected that the base server's connection path to the central management software may change. Initially, when there is no remote site network connectivity available, the base server may activate its cellular communication module to establish an initial connection via the public Internet or private carrier APN 605, to the management software on the central network.

As the remote network infrastructure facilitating the primary site uplink is provisioned and becomes available, the base server's failover and fail forward mechanism automatically selects the primary uplink as the least cost path 606, and terminates then re-establishes the VPN connection.

For this reason, VPN connections are always established in this northbound manner, from the base server on the base server to the management software.

All ongoing communications, included but not limited to repository replication, provisioning configuration transfer 607, etc., are tunneled inside the management VPN. Virtual IP addresses at both the management software and base server endpoints of the tunnel allow bidirectional (both north- and south-bound) communications inside the tunnel.

Figure 7:
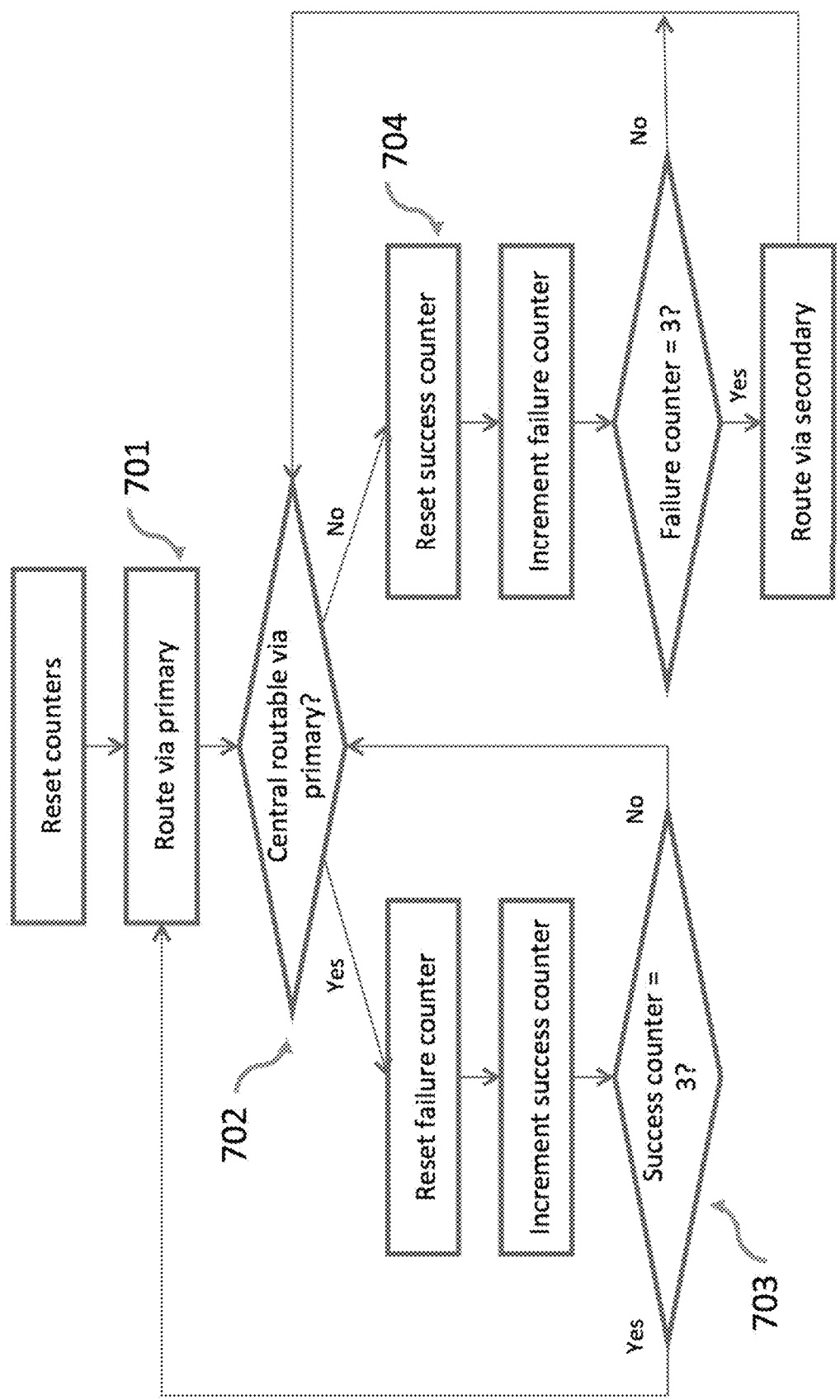
FIG. 7, pertaining to base server failover and fail forward aspects, is a flow chart depicting the logic used by the base server to determine the viability of network path to activate for routing communications (e.g., the initial Call Home and/or ongoing Management VPN connection) to the central site management software, according to certain implementations herein.

FIG. 7, pertaining to base server failover and fail-forward aspects, is a flow chart depicting the logic used by the base server to determine the viability of network path to activate for routing communications (e.g., the initial Call Home and/or ongoing Management VPN connection) to the central site management software, according to certain implementations herein.

Due to the nature of the solution, there is no expectation of a viable network uplink at the remote site. In most cases, this uplink will be provided by network infrastructure that is being provisioned by this system, therefore will become available as the provisioning process completes. This external uplink is typically the primary network path for the remote site.

The secondary network uplink is typically the cellular communications module of the base server. Although termed the secondary connection, in many cases it will be the only initially viable network uplink.

It is assumed that the primary uplink is the least cost path, so it is preferred 701. Network uplink viability is tested by testing the reachability 702 and stability 703 of the central site management software via the path under test.

Reachability is determined by creating a northbound connection to the management software IP or DNS address sending a request using a standard protocol expected to by available and listening at this address, such as ICMP echo, HTTPS or OpenVPN. If the protocol receives the appropriate response to the request meeting pre-determined performance metrics, the test is considered passed.

Stability is determined by mandating that three successive reachability tests must pass before the uplink is considered viable. Should a test not pass, the corresponding counter is reset 704.

Once an uplink is activated as the network path, is it continually tested to assure ongoing viability.

Figure 8:
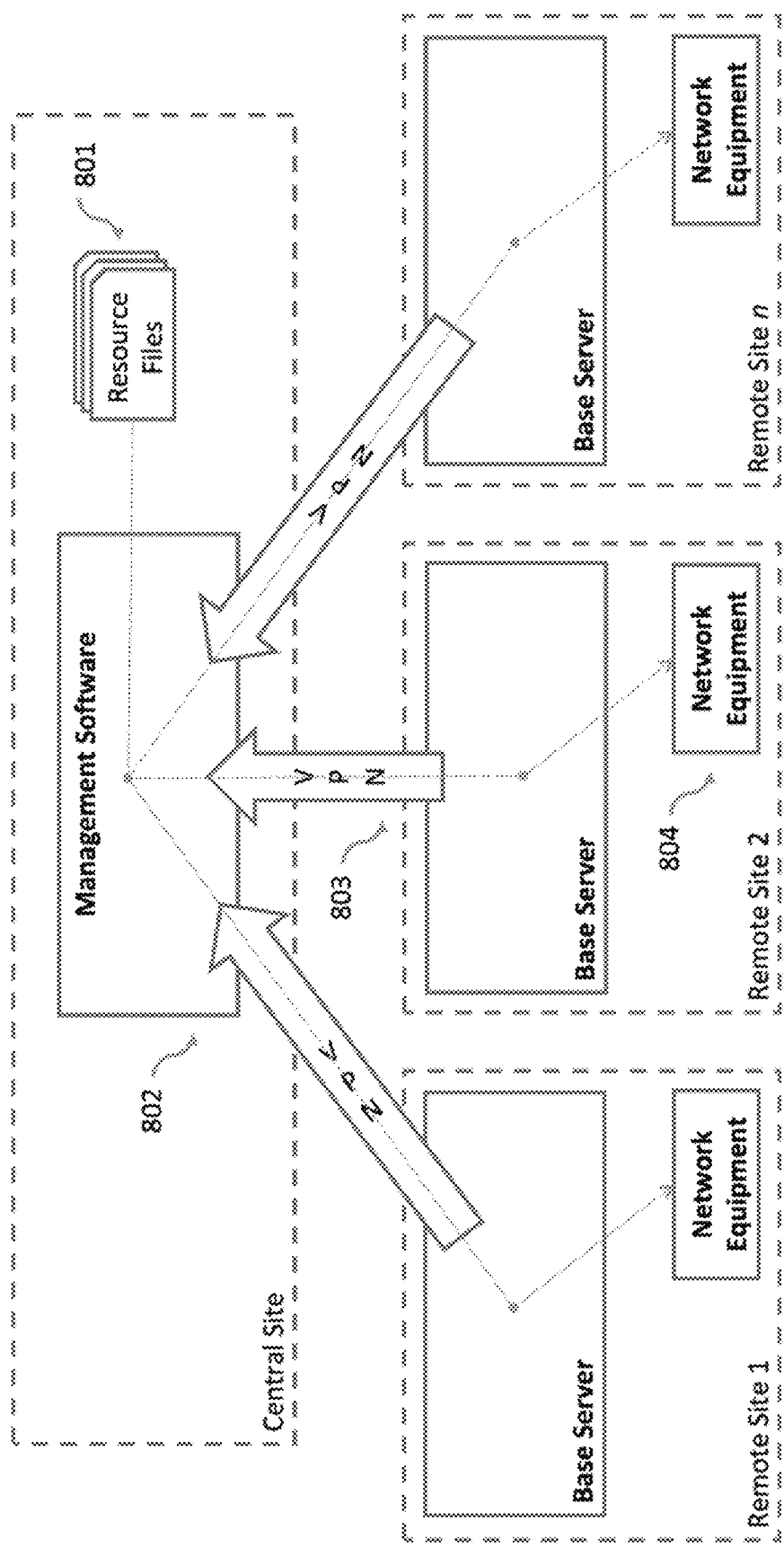
FIG. 8, pertaining to network equipment resource propagation aspects, is a block diagram depicting the propagation of the configuration file and image repository files from the central site to network equipment at remote sites, according to certain implementations herein.

FIG. 8, pertaining to network equipment resource propagation aspects, is a block diagram depicting the propagation of the configuration file and image repository files from the central site to network equipment at remote sites, according to some implementations herein.

Resource files 801 are transferred by the user, or a user-integrated third-party system, to the management software 802 using standard protocols for network file transfer.

An inventory file groups resource files and match them to specific network equipment, e.g. by vendor identifier or hardware address. The inventory files may also specify the specific groups of resource files that should be propagated to a specific base server or server(s).

When the file transfer is complete, the management software commits the inventory and resource files to its central image and configuration repository. Alternatively, the repository may be accessed directly by the user or user-integrated system using distributed source control (e.g. git).

The commit action triggers a post-commit hook that parses the inventory files and replicates the appropriate resource files to the base server's or base servers' remote image and configuration repository. The replication, as with all network communications, and encrypted using the management VPN 803 which is routed over an automatically activated network connections, as selected by the base server.

The replication process generates system-level configuration for the base server to serve the resource files to the matching network equipment, using standard provisioning services such as DHCP and TFTP. Once configuration has been generated, the provisioning services are started or restarted, and listen for and serve provisioning requests from network equipment 804.

Figure 9:
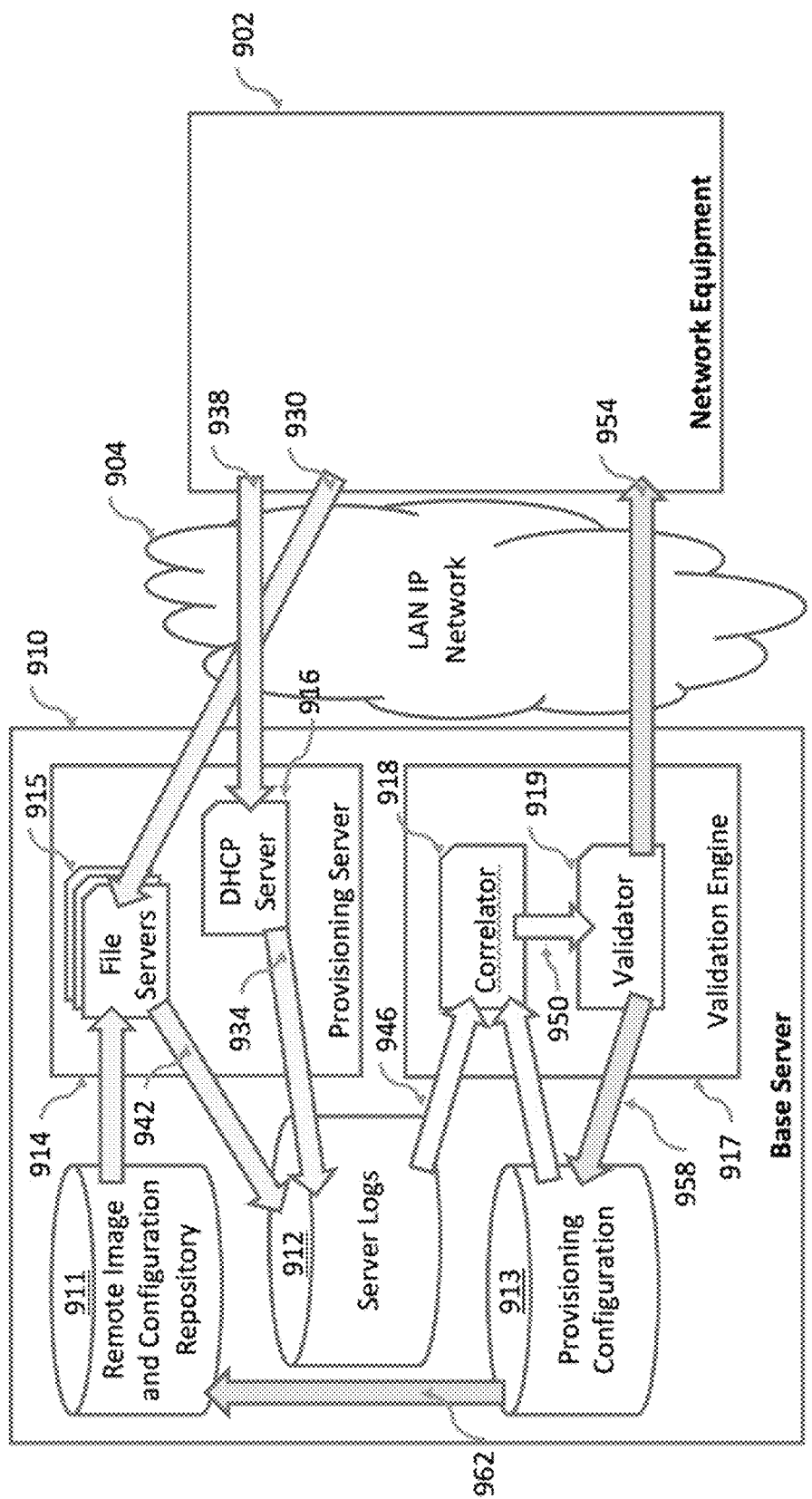
FIG. 9, pertaining to ordered provisioning workflow aspects, is an example workflow diagram depicting various illustrative orchestration (ordered provisioning) aspects consistent with the present remote network provisioning innovations, according to certain implementations herein, according to certain implementations herein.

FIG. 9, pertaining to ordered provisioning workflow aspects, is an exemplary block diagram depicting an illustrative process that provisions the network equipment, according to some implementations herein. In the exemplary process, the base server 910 can comprise of remote image and configuration repository 911, server logs 912, a provisioning configuration 913, provisioning server 914, and a validation engine 917. In some embodiments, the provisioning server comprises of file servers 915 and a DHCP server 916. In some embodiments, the validation engine comprises of a correlator 918 and a validator 919. The base server 910 is connected to network equipment 902 through a LAN IP network 904.

The base server 910 transitions the DHCP server configuration through provisioning phases to ensure network equipment 902 is provisioned in the appropriate order. The order is defined by the user at the central site using a simple queue or complex dependency graphs, and retrieved by base server 910 during a Call Home connection. Individual network equipment can be identified by MAC address, MAC address pattern, or vendor-specific ZTP options (e.g. serial number). In the first step 930 of the exemplary process, network equipment 902 receives a lease from the DHCP server 916 that specifies file URL(s) (this lease may be on a temporary provisioning subnet). In the second step 934 of the exemplary process, the lease and the MAC address of the network equipment 902 is logged to the base server logs 912. In the third step 938 of the exemplary process, the network equipment 902 requests and retrieves files from the file server 915. In the fourth step 942 of the exemplary process, the download and the MAC address of the network equipment 902 is logged to the base server logs 912. In the fifth step 946 of the exemplary process, the correlator 918 parses the logs to match the leases to the file downloads, ensures that all file URLs handed out to the selected MAC address have been successfully downloaded, checks provisioning configuration for final provisioned IP addresses and a post-provisioning checklist. In the sixth step 950 of the exemplary process, the validator 919 is triggered against the IP address of the network equipment 902 and configures IP alias on final provisioned subnet if required. In the seventh step 954 of the exemplary process, the validator 919 runs post-provisioning checks (e.g. ping, LLDP) on the network equipment 902. In the eighth step 958 of the exemplary process, the validator 919 flags network equipment 902 as successfully provisioned or failed. In the ninth step 962 of the exemplary process, the DHCP server 916 is updated to enable a DHCP lease for the next network equipment in queue if the previous provisioning was successful. If the provisioning fails, the process stops.

Following the exemplary process accordingly, the process ensures that inline firewall, IDS, and other critical equipment are provisioned first before configuring other devices, for example, a router to the WAN. Furthermore, the process ensures that any intermediary switches between the base server and other equipment are provisioned first because if the switches were not provisioned first, the other equipment's ZTP requests cannot reach the base server. Further, the process can ensure that access to sensitive equipment is disabled before provisioning other equipment providing local access, for example, a wireless access point.

Figure 10:
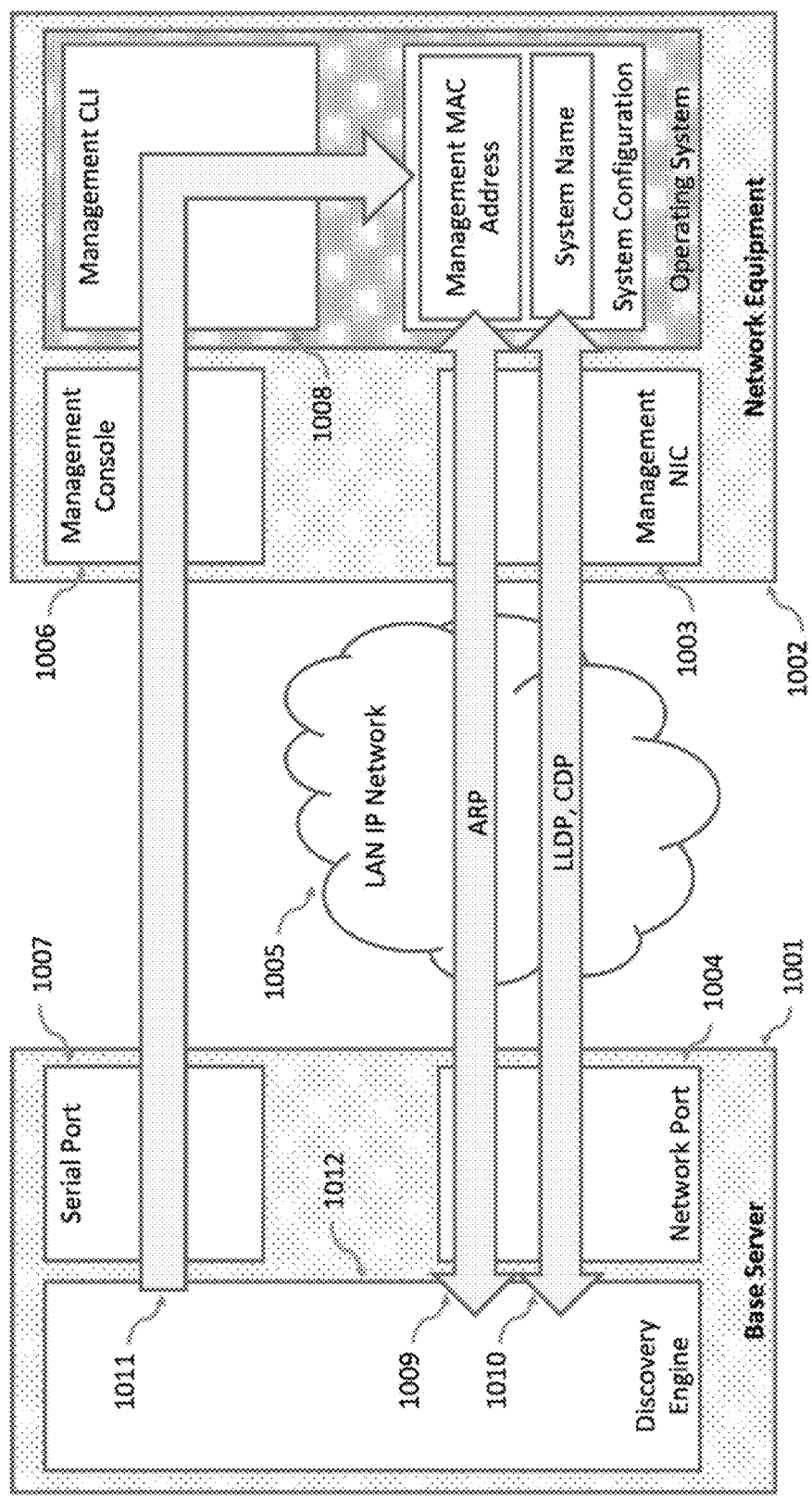
FIG. 10, pertaining to network equipment discovery aspects, is a block diagram depicting an example of how two physically separate connections using separate media and protocols are correlated to form a consolidated view of remote site network equipment, according to certain implementations herein.

FIG. 10, pertaining to network equipment discovery aspects, is a block diagram depicting an example of how a two physically separate connections using separate media and protocols can be correlated to form a consolidated view of remote site network equipment, according to some implementations herein.

To perform provisioning, the base server 1001 must be connected to the network equipment 1002 management Ethernet port (Management NIC) 1003 either directly to one of its network ports 1004, or via an intermediary Ethernet switch. The network equipment's management NIC broadcasts the provisioning requests over the LAN IP network 1005, and performs the resource file transfer to complete provisioning.

The base server has an optional persistent RS-232 or USB connection to the network equipment dedicated out-of-band management console port (Management Console) 1006 directly one of its serial ports 1007. This connection can be used to manual configuration via management CLI 1008 commands but is not used as part of the automatic ZTP process.

The base server will glean information about the network equipment during and after the provisioning process, including but not limited to, its hardware (MAC) address, its make and model, and its hostname, using standard network protocols like ARP 1009, CDP and LLDP 1010.

The base server may optionally launch an automated user session 1011 via each of its serial ports, and query the connected network equipment's hardware address, make/model, hostname, and other information.

This information may be used by the Discovery Engine 1012 to automatically correlate a given piece of network equipment's management console connection, to its network IP. This correlation in turn may be used for automated operations using its privileged out-of-band management CLI, including but not limited to, querying the configuration state to test provisioning completion, configuration integrity validation, ongoing anomaly detection, and resetting the network equipment to factory defaults to re-trigger provisioning.

This correlation may also be used to automatically provide out-of-band management access to central site network engineers through to remote site network equipment, without these network engineers requiring any knowledge as to how it has been physically cabled.

Figure 11:
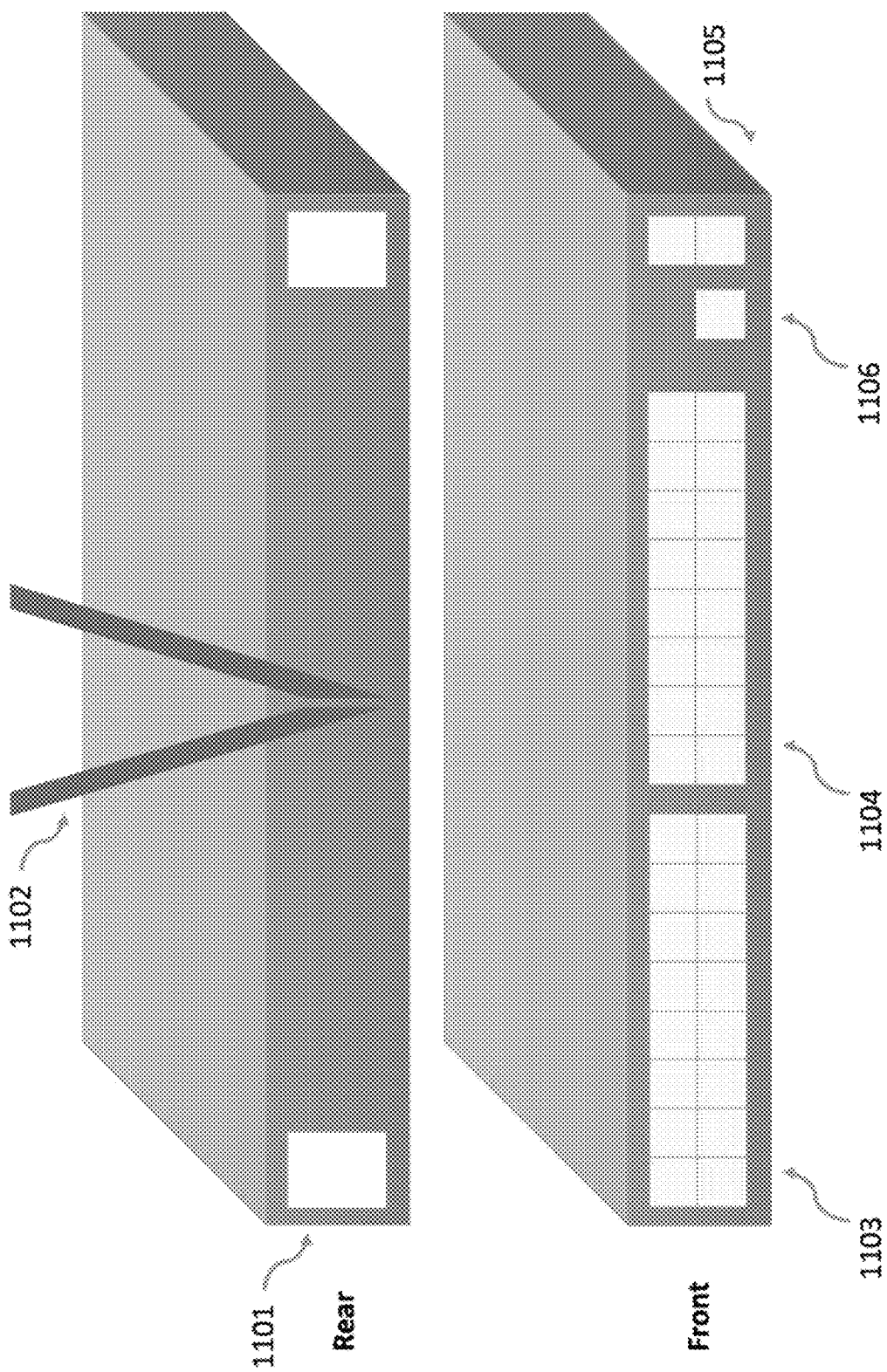
FIG. 11, pertaining to base server physical representation aspects, is an illustration of an example implementation of a base server, according to certain implementations herein.

FIG. 11, pertaining to base server physical representation aspects, is an illustration of an example implementation of a base server, according to some implementations herein.

Depicted on the rear face are power inlets 1101 and the cellular antennas 1102 of its in-built cellular communications module. Depicted on the front face are banks of serial ports 1103 and network ports 1104 for connecting to the management consoles and management NICs of network equipment for provisioning and management, network ports 1105 for connecting to the primary network uplink, and an auxiliary console port 1106 for local maintenance.

Consistent with the innovations set forth, above, systems and methods for automatically and securely provisioning computer network infrastructure in remote (and potentially untrusted) physical environments are provided. According to one illustrative implementation, for example, a representative method may comprise:

Preconfiguring a base server to a specific user/network— Consistent with such pre-configuration aspects, a base server may be ordered by the customer, and a particular base server is chosen from system vendor stock to be fulfilled. The fulfillment process involves performing a number of operations on the base server, to configure it for that customer. The first step involves generating credentials for the cloud hosted central site management services and storing these credentials inside TPM memory on the base server. In some situations, this may include generating a full VPN configuration.

In some embodiments, a number of certificate(s) may also be installed. These include a device specific long lived (20 year) certificate, with the public key stored in NVRAM, along with the private key in TPM memory, and the public key of the system vendor CA used to validate firmware in NVRAM.

After this software process is completed, the base server will reboot. In some implementations, this boot process involves generating an encryption key for the secure storage partition on the server. This key will be stored in TPM memory. If a configuration reset occurs, this key will be deleted from the TPM.

The base server will also validate its running firmware using the system vendor CA by verifying computed signed hash(es) of the root file system, and kernel against the CA. In an alternative implementation, when the firmware is installed on the device, the hashes of the kernel and the root filesystem are computed and signed with a private certificate.

After this initial boot process, the system vendor may install a customer provided SIM card, and test the cellular functionality. In some implementation, this may be a system vendor provided SIM that provides access to a system vendor managed cloud network.

The details of the base server (including the public key of the device certificate, device serial number, MAC addresses, hash of the call home token, IMEI, etc.) are stored in the system vendor central database, and the system vendor ships the server to the remote site.

Configuring the base server—Once the base server has been fulfilled by the system vendor, the customer is provided with the details of the base server, allowing them to log into a multi-tenanted central portal, to perform enrollment of the devices, and configure the network provisioning stage. The central portal is an embodiment of the central site management software, operated by the system vendor as a cloud service.

When configuring enrollment, the customer can choose from a list of fulfilled base servers to enroll, or they can opt to automatically approve all base servers that have been assigned to the customer by the system vendor.

The customer then configures the networking stage. This is done by uploading network element ZTP scripts and firmware (provisioning resources), and associating MAC addresses or ranges with the uploaded firmware and scripts. These associations may be used to generate DHCP lease configuration on the base server. The central portal also contains some basic pre-canned profiles for common network equipment, that the customer can use. These profiles are aimed at creating a basic management VLAN.

Once this is done, these associations are mapped to one or more base servers. After this, the equipment is ready for installation.

Installing the base server—The base server arrives as the deployment site, and a technician racks, and powers on the base server. The base server will go through a boot process. One implementation of this boot process is as follows.

Once the base server starts to boot, the system executes its pre-boot code, which is stored in tamper resistant read only flash memory. The system status LED is set to solid amber. During this execution, measurements are provided to the TPM. These measurements include computed hashes of the pre-boot code, as well as hashes of any peripheral firmware which is stored in the flash memory. The pre-boot code then verifies the signed kernel image against the system vendor CA, and executes the kernel. Once the kernel is running, it retrieves secure storage encryption key from the TPM, and decrypts the secure storage. Once the system is booted, the system status LED changes to flashing green. In some implementations the TPM contents will be erased if physical tamper seals have been disturbed.

If the boot process fails, then the system LED flashes amber, or turns off. The TPM could also be configured to delete all its internal secrets.

Once the boot process is seen to have succeeded, the technician will cable console connections and management Ethernet connections to the base server.

Connecting to central site—The base server attempts to establish a secure connection to the central management portal.

Its connection management and failover daemon attempt to automatically configure Ethernet network settings, via IPv4 DHCP, IPv6 DHCPv6 or SLAAC. Where both IPv4 and IPv4 connections are available, IPv6 is preferred. Automatic network configuration will only succeed in scenarios where a pre-existing network is in place; in typical scenarios, automatic configuration will fail. Should automatic Ethernet network configuration succeed, and the Ethernet network be determined to be a viable route to the central portal.

Should automatic Ethernet network configuration fail, or the Ethernet network is determined not to be a viable route to the central portal, the base server activates its cellular communications module. Cellular carrier-specific settings are automatically gleaned from the installed SIM card, the base server enables its cellular radio and establishes an IP connection to the cellular carrier network using the gleaned settings (e.g. APN). Once the cellular connection is tested as a viable route to the central portal.

Once a viable route has been determined, the base server establishes a secure connection to the central management portal, authenticating itself using the pre-configured credentials stored in its secure TPM memory. The central portal responds to successful authentication of a new base server, with a management VPN client configuration package. The base server downloads and installs the package, and activates its VPN client module. A northbound management VPN tunnel is established, allowing bi-directional secure communications between the base server and the central management portal.

The Ethernet network continues to be monitored for viability, at which time it becomes the preferred route to the central management portal, and the management VPN re-established, and management VPN IP settings persisted across the external state change.

Provisioning the network—The central management portal propagates network element provisioning resources to the base server.

Resources may be selectively propagated to a specific base server or set of base servers by matching base server meta-data such as location or remote site class. Meta-data attributes may be automatically populated by the base server (e.g. location as determined using cellular GPS or IP based geolocation), or arbitrarily assigned by the customer.

Alternatively, resources associated with specific network elements MAC addresses may be safely propagated to all base servers, eliminating the risk of network element misprovisioning.

Once propagation is complete, the base servers' ZTP services (DHCP and file servers) are started or restarted and actively listen for network element provisioning requests. Provisioning requests that match the profile and/or MAC address of network resources are answered and the network element downloads an initial configuration file, configuration and/or optional firmware upgrade image from the base server. In some cases, matching provisioning requests are ignored until in accordance with the ordered provisioning policy configured by the customer.

Network elements continue to broadcast provisioning requests until successfully provisioned. Once network elements have downloads provisioning resources, their internal provisioning code applies the configuration, and may reboot.

The base server monitors provisioning progress of the network elements, to determine provisioning has completed successfully. Detecting success may involve one or more of, but is not limited to; testing for download success; detecting successful reboot; inspecting running configuration via management console; testing IP connectivity on the production network; running a customer supplied script to determine success or failure.

As part of the provisioning process, network elements may need to contact central or cloud services such as DNS or third-party configuration management system. The base server may assign its own Ethernet address as the network elements' default gateway, enabling the base server to function as a temporary or bootstrap network uplink, allowing these connections from network elements to public network services to succeed. Should the central network portal be installed and running on a customer's central LAN network, private network routes may be distributed from the central portal to the base server, allowing connections from network elements to private network services, e.g. internal corporate DNS, to succeed.

This stage continues until all network elements are determined to have been successfully provisioned. Using the central portal, the customer has visibility of the network elements that are detected by the base server at the remote site, the provisioning status of each elements, and the remote site as a whole.

Orchestrate configuration management—The base server maintains low-level management NIC and optionally management console connections to each network element for persistent and resilient out-of-band manageability. This connectivity may be leveraged by third-party configuration orchestration systems, to apply ongoing configuration updates using the configuration schema or network protocol of its choice.

Alternatively, a "reset to reconfigure" model may be preferred, to combat configuration drift, and to collapse provisioning, maintenance, and disaster recovery workflows into a single process. In this scenario, provisioning resources updated to reflect the network element's updated configuration settings are propagated to the base server, and the network element is remotely reset to its factory settings, and "initial provisioning" occurs using the updated settings.

Appendix: Further/Optional Modules or Aspects

Wireless provisioning-battery powered Wi-Fi <-> Ethernet bridge connects to target equipment management Ethernet port, client connects to Server Wi-Fi AP for wireless ZTP (e.g., Bluetooth adapter connects to target equipment console port, etc.), mitigates rack & stack faults, end-to-end wireless provisioning (cellular+Wi-Fi+Bluetooth)
1. Day zero discovery—Server uses layer 2 adjacency protocols, ping sweeps, broadcasts, etc. to discover and validate network topology, models this for orchestration tools
2. Day zero auto-provisioning—Server minimally provisions discovered equipment, e.g. load appropriate current firmware, change security credentials from defaults, configure management VLAN 3. Disaster recovery—Server saves end day 1 configuration and/or uses equipment configuration backup mechanisms, to restore configuration in response to an equipment fault or failure (e.g. power fault brings primary gateway, switch down), minimal configuration to facilitate orchestration
4. Continuous validation, audit—Server monitors configuration and topology and alerts/restores on deviation, orchestration integration
5. Orchestration translation gateway—translate commands from orchestration products such as Puppet, Chef, Ansible among others into standard local management protocols such as SNMP, NETCONF, IPMI among others.

The invention claimed is:

1. A provisioning system that provisions computer network infrastructure at a remote site and employs at least one network connection enabling communication between a central site and the remote site, the system comprising:
a base server at the remote site executing first management software, the base server including one or more processors, a plurality of remote network interfaces, and computer-readable media; and
a plurality of network elements at the remote site including routers and/or switches that are provisioned to form a computer network infrastructure;
wherein second management software is executed in at least one computer at the central site, the second management software executing a process including:
A. receiving a connection request, and establishing a trusted connection with the base server at the remote location;
B. configuring the remote base server and downloading configuration and firmware image files retrieved from an image and configuration repository;
C. transmitting commands that prepare the base server at the remote site to become a provisioning server for the remote location; and
D. provisioning the network elements at the remote site including loading configuration information to the network elements from the base server, the configuration information comprising one or more of firmware images, configuration files, or configuration scripts, wherein the network elements are provisioned in an order specified via a user using a central portal accessible via the at least one computer at the central site, wherein the central portal enables specification of configuration information;
wherein the first management software is executed via the one or more processors included in the base server to provision the network elements, and wherein provisioning the network elements comprises:
sequentially assigning network access to respective network elements according to the order, wherein a network element assigned network access is configured to obtain configuration information specified via the central portal, and
determining successful provisioning of the network elements;
wherein, as a function of one or more of the automatic integrity verification features of the remote base server and the configuring and/or transmitting steps being executed automatically, the system eliminates a need for human intervention at the remote site beyond physical installation of the equipment.

2. The system of claim 1, wherein the network connection between the central and remote sites is done over the public Internet using a mix of standard TCP/IP protocols, and wherein data between the central site and the remote site is encrypted before transmission and decrypted after reception at both ends of the connection.

3. The system of claim 1, wherein the network connection between the central and remote site is done automatically over a private IP connection using a mix of standard TCP/IP protocols.

4. The system of claim 1, wherein the network connection between the central and remote site is done over a cellular network using a mix of standard TCP/IP protocols and includes a process that is performed on top of the mix of protocols.

5. The system of claim 1, wherein data between the central and remote site is transmitted over a VPN tunnel, being encrypted before transmission and decrypted after reception at both ends of the connection.

6. The system of claim 1, where the base server includes tamper-resistant mechanisms to prevent and alert physical intrusions to the system.

7. The system of claim 1, where the base server includes capability of verifying that hardware, software, and configuration have not been tampered with before booting up and starting operation.

8. The system of claim 1, wherein the base server offers a container or package management system, allowing network operation software to be deployed to automate additional aspects of the network operation.

9. The system of claim 1, wherein the base server implements translation and proxy functions that enable traditional network provisioning protocols, originally designed to operate in a local network to be used to provision a remote site from a central site.

10. The system of claim 1, wherein the base server correlates information between the network and management connections to automate the provisioning, management and/or identification of network devices.

11. The system of claim 9, wherein the base server and the central site software implement proxying techniques utilizing port forwarding and tunneling so that two devices, a first device at the central site and a second device at the remote site are connected to communicate with each other using standard protocols as if they were local to each other without any awareness or special configuration needed in either said device.

12. The system of claim 10, wherein the base server leverages the console connection and a direct data connection and a network connection to simulate a human operation typing commands on a management interface to trigger events on at least one of the remote network interfaces and other data interfaces to accomplish tasks that were only possible with the presence of a human operation at the remote site.

13. The system of claim 10, wherein the network connection between the central and remote site is done over a cellular network using a mix of standard TCP/IP protocols and includes a process that is performed on top of the mix of protocols.

14. The system of claim 10, wherein the base server implements translation and proxy functions that enable traditional network provisioning protocols, originally designed to operate in a local network to be used to provision a remote site from a central site.

15. The system of claim 1, wherein the base server, instead of being configured at the central site before being shipped to the remote site, is configured at the remote site through the central portal, and wherein the central portal is accessible via a Network cloud service.

16. The system of claim 1, wherein determining successful provisioning of the network elements comprises one or more of testing for download success, detecting successful reboot, inspecting running configuration via management console, testing network connectivity, or running one or more scripts to determine success or failure.

17. The system of claim 1, wherein the central portal enables specification of configuration information via user selection of templates associated with configuring network elements.

18. The system of claim 1, wherein the base server comprises a trusted platform module (TPM) which stores credentials usable to access the central management portal and to trigger provisioning of the network elements.

19. The system of claim 1, wherein the base server comprises a dynamic host configuration protocol (DHCP) server and a file server, and wherein provisioning the network elements further comprises:
  sequentially assigning DHCP leases to respective network elements, wherein the DHCP leases specify file uniform resource locators (URLs) at which configuration information may be obtained via the file server, and wherein the respective network elements are provisioned based on the configuration information.

20. The system of claim 1, wherein the order is specified according to a dependency graph.

* * * * *